United States Patent [19]

Mutsuura

[11] 3,873,778

[45] Mar. 25, 1975

[54] SIGNAL PROCESSING SYSTEM

[75] Inventor: Yoshimichi Mutsuura, Isehara-shi, Kanagawa-ken, Japan

[73] Assignee: Sony Corporation, Tokyo, Japan

[22] Filed: June 6, 1973

[21] Appl. No.: 367,428

[30] Foreign Application Priority Data

June 7, 1972 Japan .............................. 47-56722
June 7, 1972 Japan .............................. 47-56724

[52] U.S. Cl. .................... 179/15.55 T, 178/7.5 DC
[51] Int. Cl. .......................................... G06f 3/16
[58] Field of Search ............ 179/15.55 T, 15.55 R; 178/6.6 FS, 7.5 DC

[56] References Cited

UNITED STATES PATENTS

| | | | |
|---|---|---|---|
| 3,104,284 | 9/1963 | French | 179/15.55 R |
| 3,499,996 | 3/1970 | Klayman | 179/15.55 R |
| 3,504,352 | 3/1970 | Stromswold | 179/15.55 T |
| 3,584,158 | 6/1971 | Jefferies | 179/1 SA |
| 3,619,648 | 11/1971 | Wolber | 178/7.5 DC |
| 3,621,150 | 11/1971 | Pappas | 179/15.55 T |
| 3,681,756 | 8/1972 | Burkhard | 179/1 SA |

OTHER PUBLICATIONS

J. S. Gill, A Versatile Method for Short Term Spectrum Analysis in Real Time, Nature, 1/14/1961, pp. 117-119.

*Primary Examiner*—Ralph D. Blakeslee
*Attorney, Agent, or Firm*—Lewis H. Eslinger; Alvin Sinderbrand

[57] ABSTRACT

A signal processing system for performing compression and/or expansion of sound signals reproduced from a magnetic tape. The system includes a pair of analog shift registers, one of which is used for writing in an input reproduced sound signal under the control of a clock signal having a frequency corresponding to the speed of the reproducing magnetic tape and the other shift register being used for reading out the sound signal under the control of a standard clock signal. This system is further provided with compensating means for cancelling a D.C.-level deviation in the output signal.

12 Claims, 30 Drawing Figures

(PRIOR-ART)

SIGNAL PROCESSING SYSTEM

BACKGROUND OF THE INVENTION

The present invention relates generally to a signal processing system, and more particularly to a signal processing system which can reproduce an information signal recorded on a recording medium in a shorter time (sound compression) than the recording time or in a longer time (sound expansion) than the recording time without changing its frequency.

A signal processing system utilizing a pair of analog shift registers, for example, of the bucket brigade delay line (B.B.D.) type to electrically achieve sound compression and/or expansion is known. A pair of shift registers are used to alternately write in a sampled input signal and read out the signal. When a first one of the registers is accepting the sampled input signal the other of the registers is producing the sampled signal as an output.

In the situation where the system is used for sound compression a magnetic tape with a signal recorded thereon is driven at a speed which is higher than the speed at which the signal is recorded in order to reproduce the recorded signal in a shorter time period but without changing its signal frequency. A first one of the registers is used for writing in the signal and the sampled input signal is then transferred under the control of a clock signal having a frequency proportional to the actual tape speed. Simultaneously a sample signal stored in the second register is read out sequentially under the control of a standard clock signal corresponding to the tape speed at which the recording was made. After the contents of the second register have been completely read out the role or write and read functions is alternated between the first and second registers. Since a part of the sampled signal written in the first register and transferred through it has already been lost, a discard interval of several milliseconds appears in the output signal, but the "keep" interval of the sampled signal which is read out is always constant. The signals read out sequentially from the first and second registers are repeatedly reproduced with the constant discard and keep intervals so that the information can be processed in a short time period but with the same signal frequency.

In the situation where the sound is to be expanded, the input signal is sampled at a lower frequency rate in response to the tape speed and the read out is performed under the control of a standard clock pulse. The role of the registers is interchanged so that the sampled signals sequentially read out from the read register are reproduced at a constant time interval and the information content is processed in a relatively long time period.

In conventional sound compression and/or expansion systems with the analog shift registers mentioned above, the sampled signals stored in the register causes a D.C. level variation due to leakage currents and also due to the frequency difference between the clock signal (3 times $f_0$, for example) used for writing in the input signal in the register and the standard clock signal ($f_0$) used for reading out the stored signal so that the sampled signal initially written in the register differs from the signal which remains in the register at the end of the time period that the signal is stored in the register. As a result, the D.C. level of the signal finally read out may be changed to have a sawtoothed waveform. Because the D.C. level is varied in such a manner it changes from a maximum value to a minimum value abruptly or vice versa when the registers are interchanged. For this reason a pulse type noise appears which deteriorates the listening quality of the output signal.

SUMMARY OF THE INVENTION

The present invention of a signal processing system for performing sound signal compression and/or expansion overcomes the above and other disadvantages of the prior art and comprises delay line means coupled to an external source of information signals for propagating the information signals with controllable frequency transformation, means for controlling the delay line means to produce the frequency transformation, and means for compensating for D.C. level-deviation of an output signal read out from the delay line means.

In the preferred embodiments the delay line means comprise a pair of shift registers which are used alternately for writing in and reading out an information signal. The control means is provided with a first clock signal generator the frequency of which is set in relation to the rate at which the information signal is reproduced, which is at a time rate different than that of the original signal, and a second clock signal generator of a fixed frequency. The information signal is written in one of the registers by the first clock signal and read out from the other register by the second clock signal. The delay line means further includes means for recirculating the information signal read out from the shift register to an input thereof.

In one preferred embodiment the compensating means comprises means for producing a pair of information input signals differing in phase by 180° from each other, means for alternately sampling the pair of input signals in turn and for supplying the sampled signal to the delay line means, means for detecting an in phase component of the output signal read out from the delay line means and for producing a pair of output signals 180° out of phase with respect to each other; and means for differentially processing the pair of output signals derived from the detecting means. The detecting means comprises two, signal holding circuits separately driven by clock signals differing in phase by 180° from each other, for holding the read-out signal for at least twice the duration of the sampled signal.

Accordingly, it is an object of the present invention to provide an improved signal processing apparatus which performs signal compression and/or expansion.

It is another object of the present invention to provide a new sound signal compression and/or expansion system which utilizes an analog shift register connected in a signal transmission line.

It is a further object of the present invention to provide a sound compression and/or expansion system which includes means for compensating for a D.C.-level deviation of the output signal processed by the analog shift register.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
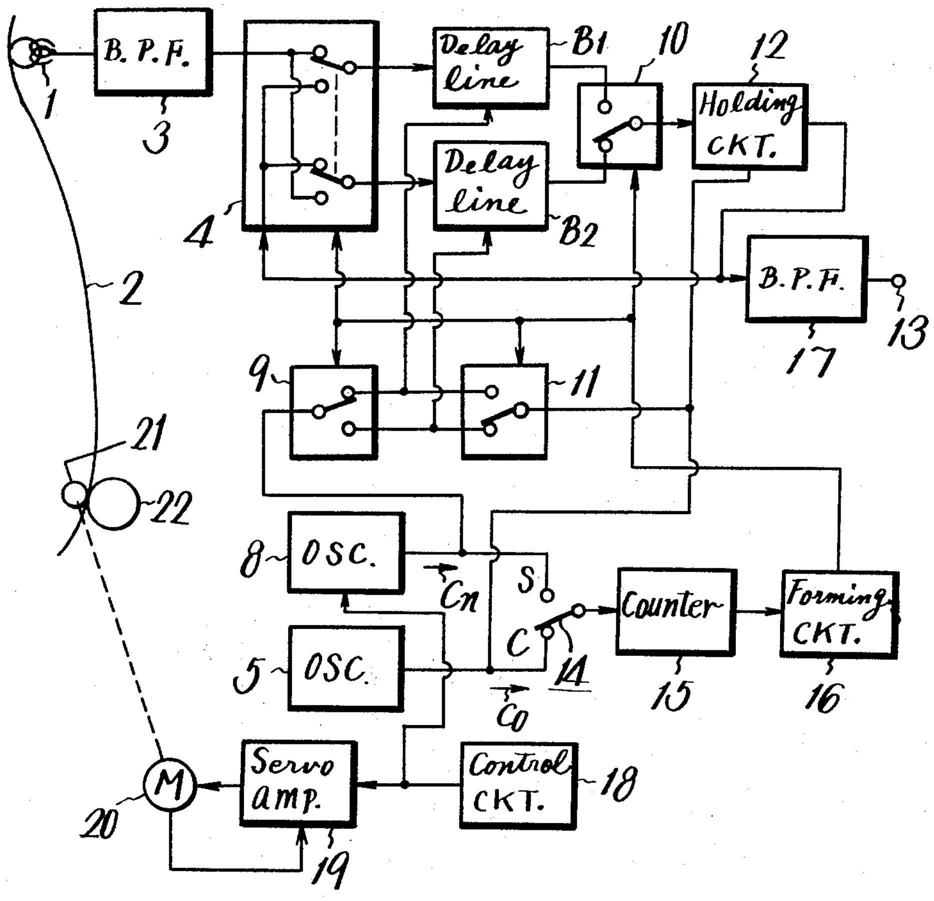
FIG. 1 is a block diagram of a conventional signal processing system for performing sound signal compression and/or expansion.

Referring now more particularly to FIG. 1 an example of a conventional signal processing system for achieving sound compression and expansion will now be described. References $B_1$ and $B_2$ indicate variable delay lines which sample an analog signal and propagate the sampled signal under the control of a clock pulse. Such variable delay lines $B_1$ and $B_2$ may be of the so-called bucket brigade delay line (B.B.D.) type. A magnetic reproducing head 1 reproduces a signal recorded on a magnetic tape 2 which is driven by a capstan 21 and a pinch roller 22 arrangement. The output signal reproduced by the magnetic head 1 from the tape 2 is applied through a bandpass filter 3 to a switching circuit 4. An oscillator 5 generates a clock pulse $C_0$ having a standard frequency $f_0$ and this clock pulse is applied to a switching circuit 11 to control the reading out operation of the system. The clock pulse is therefore referred to as a read clock pulse.

A second oscillator 8 is controlled by the output signal from a control circuit 18 to produce a clock pulse $C_n$ having a frequency proportional to the speed of the tape 2 at that point in time. The clock pulse $C_n$ is fed to a switching circuit 9 to control the writing operation and is therefore designated a write clock pulse. A motor drive circuit 19 controls the speed of the magnetic tape 2. The drive circuit 19 is in turn controlled by the control circuit 18. The tape 2 is driven in a predetermined direction by the capstan 21 rotated by the motor 20. The motor drive circuit 19 is supplied with both the control signal from the control circuit 18 and an output signal from a frequency generator (not shown) which detects the rotational speed of the motor 20 to control the rotational speed of the motor 20. For example, when the write clock pulse has a frequency of $2f_0$ the tape 2 is driven at a speed which is twice the normal speed and when the write clock pulse has a frequency of $\frac{1}{2} f_0$ the tape 2 is driven at a speed which is one-half the normal speed. The write clock pulse is produced in the oscillator 8.

The clock pulse $C_0$, of the standard frequency $f_0$, is fed to a contact terminal C of a switch 14 from the oscillator 5 and the clock pulse $C_n$, with a frequency proportional to the tape speed, is fed to a contact S of the switch 14 from the oscillator 8. When the tape 2 travels at a speed higher than normal, the contact arm of the switch 14 connects with the contact C to supply the read clock pulse $C_0$ to a counter 15 and when the tape 2 travels at a lower than normal speed the contact arm of the switch 14 is connected to the contact S to supply the write clock pulse $C_n$ to the counter 15. The counter 15 thus counts one or the other of the clock pulses $C_0$ or $C_n$ to produce an output signal at each point in time when the counter 15 has counted in N number of pulses if the number of stages in the delay lines $B_1$ and $B_2$ is N.

The output of the counter 15 is fed to a switching-signal forming circuit 16, which may comprise for example a flip-flop circuit. The switching-signal forming circuit 16 produces a switching signal which is reversed in response to each output signal from the counter 15. The switching signal from the circuit 16 is applied to simultaneously switch the switching circuits 4, 9, 10 and 11 alternately each time the counter 15 counts N clock pulses supplied from the switch 14.

Thus for the arrangement shown in FIG. 1, the reproduced signals applied to the delay lines $B_1$ or $B_2$ are sampled with the clock pulse $C_n$ and the sampled signals are then transferred through the delay lines to the output terminal 13. The sampled signal which has already been written in the delay line $B_1$ or $B_2$, which is not in condition to be written, is read out under the control of the clock pulse $C_0$.

The switching circuit 10 provided at the output side of the delay lines $B_1$ and $B_2$ is alternately switched under the control of the output of the switching-signal forming circuit 16 simultaneously with the switching circuits 4, 9 and 11 to deliver the sampled signal from the delay line $B_1$ or $B_2$ to a holding circuit 12. The holding circuit 12 holds the sampled signal during the pulse interval of the clock pulse $C_0$. Accordingly, the output signal will have a step-like waveform. The step-like waveform is delivered through a bandpass filter 17 to an output terminal 13.

The output signal from the holding circuit 12 is recirculated to the switching circuit 4 whose output is connected to the delay line $B_1$ or $B_2$, that is, whichever of the delay lines was not initially supplied with the signal to be reproduced, so that the output signal can be written again under the control of a clock pulse $C_0$. This recirculated signal is used when the system operates as a sound expander to be described further in the application.

Figures 2A, 2B, 2C, 2D, 2E:
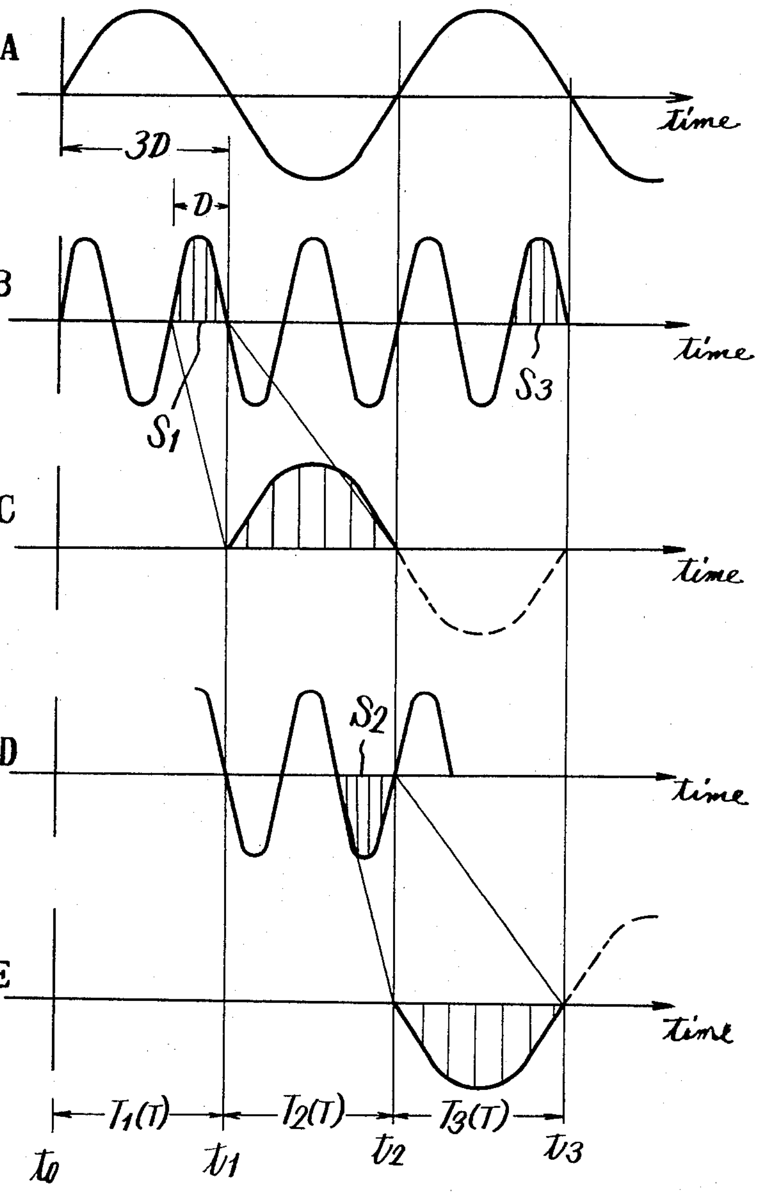
FIG. 2A is a waveform diagram of a recorded signal as reproduced from tape 2 in the system depicted in FIG. 1 when used as a sound signal compresser.
FIG. 2B is a waveform diagram of the compressed signals read into the delay line $B_1$ in the system of FIG. 1.
FIG. 2C is a waveform diagram of the compressed signals when written out of the delay line $B_1$ in the system of FIG. 1.
FIG. 2D is a waveform diagram of the compressed signals when read into the delay line $B_2$ of the system of FIG. 1.
FIG. 2E is a waveform diagram of the compressed signals when written out of the delay line $B_2$ in the system of FIG. 1.

The operation of the system depicted in FIG. 1 as a sound compressor will now be described with reference more particularly to FIGS. 2A and 2E. In this mode the switching circuits 4, 9, 10 and 11 are in the positions illustrated in FIG. 1. From a time $t_0$ to a time $t_1$, that is during the interval $T_1$ (T) of time duration T as shown in FIG. 2, the reproduced signal is written in the delay line $B_1$ under the control of the clock pulse $C_n$ while the sampled signal is read out from the delay line $B_2$ under the control of the clock pulse $C_0$. The read clock pulse $C_0$, having a frequency $f_0$ is applied from the oscillator 5 to the counter 15 so that the switching circuits 4, 9, 10 and 11 are alternately switched at each point in time when $T = N/f_0$.

At this time, when the tape travels at a speed higher than normal, such as at three times the normal speed, the distance of travel of the tape 2 during the time interval $T_1$ is 3D where D is the normal distance of travel of the tape 2 during such a time interval. Therefore, the waveform reproduced at normal speed in FIG. 2A is compressed as shown in FIG. 2B. The delay lines $B_1$ and $B_2$ are designed to have N stages and N number of write clock pulses $C_n$, generated at a frequency of $3f_0$, can be obtained only during the time duration of T/3. At this time N-buckets of delay line $B_1$ have already been written with the sampled signal and hence, thereafter, the sampled signal which has been written therein is sequentially discarded to the output side of the delay line. As a result, at the end of the time duration $T_1$, or the time $t_1$, the signals $S_1$ contained in the tape part of the final distance D and the portion 3D of the tape 2 are written in the delay line $B_1$, (FIG. 2B). In other words, when the tape 2 is driven at a speed 3 times higher than the normal speed the signal is compressed by T/3 in comparison with the signal shown in FIG. 2A and reproduced as shown in FIG. 2B.

Within the time interval $T_2$ (T) following the time interval $T_1$, the switching circuits 4, 9, 10 and 11 are switched to the position opposite to that shown in FIG. 1 and the signals corresponding to the signals recorded on the length D of the tape 2 are written in the delay line $B_2$ under the control of the clock pulse $C_n$ in a similar manner (FIG. 2D). During this time interval $T_2$ the sampled signal $S_1$ which has been written in the delay line $B_1$, is read out under the control of the clock pulse $C_0$, (FIG. 2C). As shown in the figures, the frequency of the read clock pulse $C_0$ is ⅓ that of the write clock pulse $C_n$ so that the signal $S_1$, stored during the time interval of T/3 is read out over the time interval T as is illustrated in FIG. 2C. Therefore, it will be understood that the signal delivered to the output terminal 13 is the same as that derived when the tape 2 is driven at normal speed.

During the time interval $T_3$ (T) following the time interval $T_2$, the switching circuits 4, 9, 10 and 11 are again switched to the position shown in FIG. 1 so that a signal $S_3$ corresponding to the tape portion of a distance D is stored in the delay line $B_1$, while the signal $S_2$ already stored in the delay line $B_2$ is read out during the time interval $T_3$, as shown in FIGS. 2B and 2E, respectively.

The above operations are repetitively carried out so that, as is apparent from FIG. 2, even if the magnetic tape 2 is driven at a 3 times the normal speed, the same signals $S_1, S_2, S_3, \ldots$, which would normally be derived if the tape is driven at normal speed, are delivered sequentially to the output terminal 13 at the same frequency as they were originally recorded and as shown in FIG. 2A.

The operation of the system depicted in FIG. 1 will now be described with reference to FIGS. 3A to 3E as it used as a sound signal expander. If the magnetic tape 2 is driven at a speed which is one half the normal speed, for example, the movable contact of the switch 14 is changed to connect with the fixed contact S so that a write clock pulse $C_n$ having a frequency of $f_0/2$ is supplied from the oscillator 8 to the counter 15. Accordingly, the switching circuits 4, 9, 10 and 11 are alternately switched at intervals of $(2/f_0)\cdot N = 2T$.

Figures 3A, 3B, 3C, 3D, 3E:
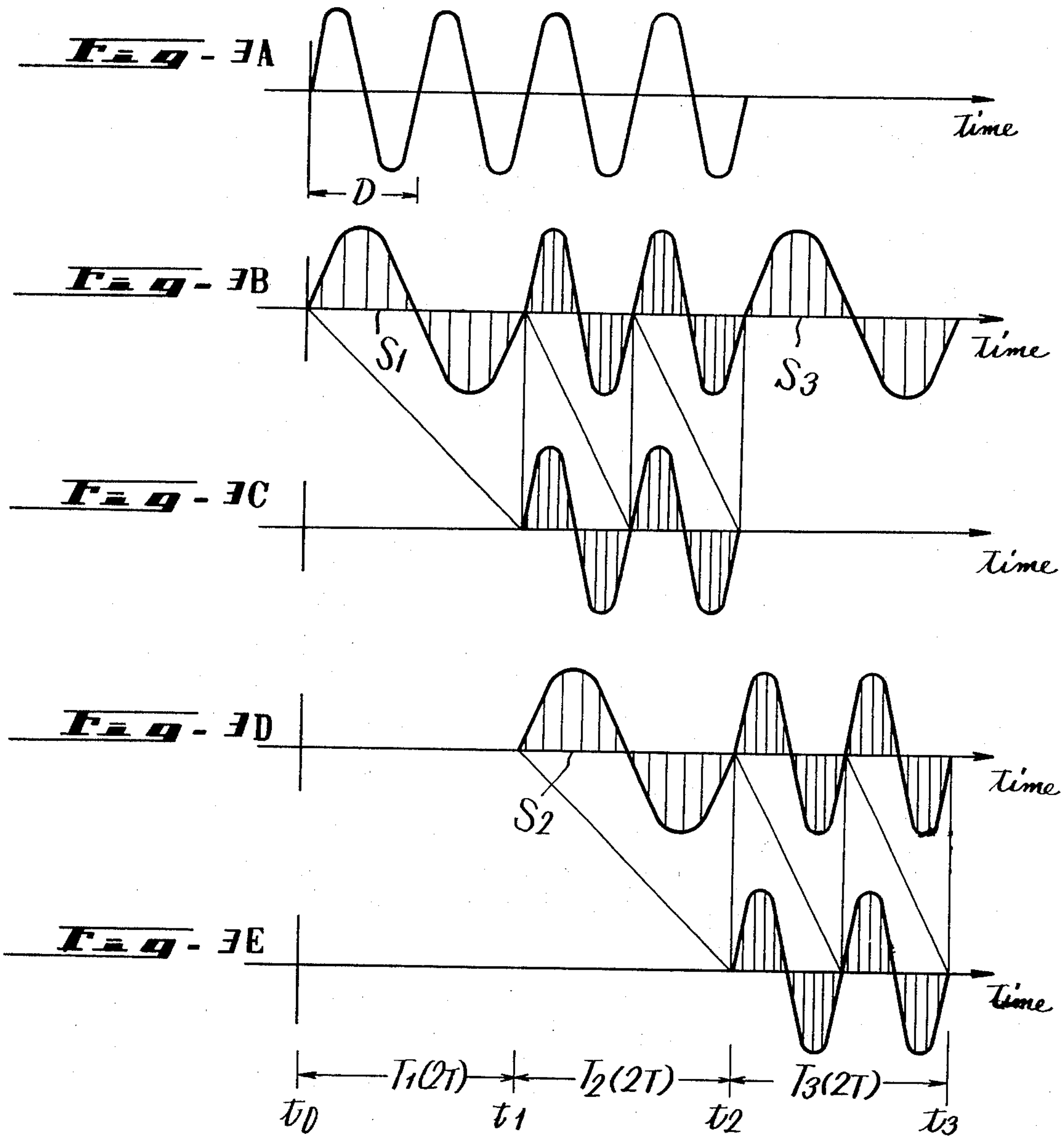
FIG. 3A is a waveform diagram of a recorded signal as reproduced from tape 2 in the system depicted in FIG. 1 when used as a sound signal expander.
FIG. 3B is a waveform diagram of the expanded signals read into the delay line $B_1$ in the system of FIG. 1.
FIG. 3C is a waveform diagram of the expanded signals when written out of the delay line $B_1$ in the system of FIG. 1.
FIG. 3D is a waveform diagram of the expanded signals when read into the delay line $B_2$ of the system of FIG. 1.
FIG. 3E is a waveform diagram of the expanded signals when written out of the delay line $B_2$ in the system of FIG. 1.

If it assumed that the switching circuits 4, 9, 10 and 11 are switched to the position shown in FIG. 1 during the time interval $T_1$ (having a time duration of 2T from an initial time $t_0$) as shown in FIG. 3, the reproduced signal from the magnetic tape 2 is written in the delay line $B_1$ under the control of a write clock pulse $C_n$ having a frequency of $f_0/2$ during the time interval $T_1$. In this operation, the magnetic tape 2 is driven at one half the normal speed so that the travel distance of the tape 2 during the time interval $T_1$ is one half of the travel distance D at normal speed. Therefore, the waveform reproduced at normal speed shown in FIG. 3A is expanded as shown in FIG. 3B. Further, assuming that the number of stages in the delay lines $B_1$ and $B_2$ is N, the write clock pulses $C_n$ of the frequency $f_0/2$ are counted to the number N in the time interval $T_1$ (2T), so that the signal is written in all of the buckets of the delay line $B_1$ at the final time $t_1$ of the time interval $T_1$. As a result, the signal corresponding to the distance D on the tape is written in the delay line $B_1$ as the input signal $S_1$, as shown in FIG. 3B. Assuming that the tape is driven at one-half the normal speed, the signal reproduced over the time period 2T is shown in FIG. 3B and N number of samples of the signal are stored in the delay line $B_1$.

During the time interval $T_2$, having a time duration of 2T following the first time interval $T_1$ (2T), the switching circuits 4, 9, 10 and 11 are changed to a position opposite to the one shown in FIG. 1, and hence the signal $S_2$ corresponding to the distance D of the tape 2 is stored in the delay line $B_2$ under the control of the clock pulse $C_n$ as shown in FIG. 3D. During this time interval $T_2$ the signal $S_1$ already stored in the delay line $B_1$ is read out under the control of the clock pulse $C_0$ (at the standard frequency) as shown in FIG. 3B and 3C. As will be apparent from these figures, the frequency of the read clock pulse $C_0$ is twice that of the write clock pulse $C_n$ so that the signal $S_1$, which is stored as a signal having a time duration of 2T, is read out during a time interval having a duration of only T within the time interval $T_2$ which has a total duration of 2T. Nevertheless, this much of the signal when delivered to the output terminal 13 is the same as a signal recorded on tape segment D which would be reproduced at normal speed as shown in FIG. 3A.

To provide the full recorded signal, the signal $S_1$ read out from the delay line $B_1$ is returned to the input side of the system through the switching circuit 10, the holding circuit 12 and the switching circuit 4, so that the signal $S_1$ is successively written in the delay line $B_1$, as shown in FIG. 3B during the time period $T_2$ (2T) under the control of the clock pulse $C_0$. Since the storage of the signal $S_1$ in the delay line $B_1$ is under the control of the clock pulse $C_0$ at the normal frequency, the time required for writing in all of the signals becomes equal to the time T for reading them out. Accordingly, the signal $S_1$ stored again in the delay line $B_1$ is read out again (FIG. 3C). Therefore, the signal $S_1$ is read out twice during the time interval $T_2$ and at the terminating time $t_2$ of the time interval $T_2$ the signal $S_1$ is again stored in the delay line $B_1$ and the signal $S_2$ is stored in the delay line $B_2$.

During the next time interval $T_3$, having a duration of time equivalent to 2T, the switching circuits 4, 9, 10 and 11 are again switched to the position shown in FIG. 1 so that a signal $S_3$ representing a signal recorded in the distance D of the tape is stored in the delay line $B_1$ under the control of a clock pulse $C_n$ (FIG. 3B), while the signal $S_2$ stored in the delay line $B_2$ is twice read out in the recirculating manner described above (FIG. 3E). In this case, when the signal $S_3$ is stored in the delay line $B_1$, the signal $S_1$ which has been stored in the delay line $B_1$ during the second half of the second time interval $T_2$, is read out under the control of the clock pulse $C_n$. However, since the switching circuit 10 is switched to the position shown in FIG. 1, i.e. in contact only with the delay line $B_2$, the signal $S_1$ is not read out from the delay line $B_1$ to the output terminal 13.

Thus, in general, an output signal is obtained from the output terminal 13, as shown in FIG. 3A to 3E which is similar to the signal obtained when the tape 2 is driven at a normal speed even if the tape 2 is driven at a speed which is one-half the normal speed.

A major disadvantage of the above described system is that the sampled signal stored in each bucket of the delay line $B_1$ and $B_2$ is subjected to DC level deviation or variation because of leakage current. The DC level deviation is proportional to the storing time in the delay line for the sampled signal. Therefore, during the reading out of the sampled signal the time period $t_R$ of the read clock pulse $C_0$ is constant so that the D.C. level deviation becomes proportional to the numbered position of the bucket stage in the delay line where the sampled signal is finally stored. That is, as the number of stages transferred during the reading out process becomes large the level deviation also becomes large.

Figure 4:
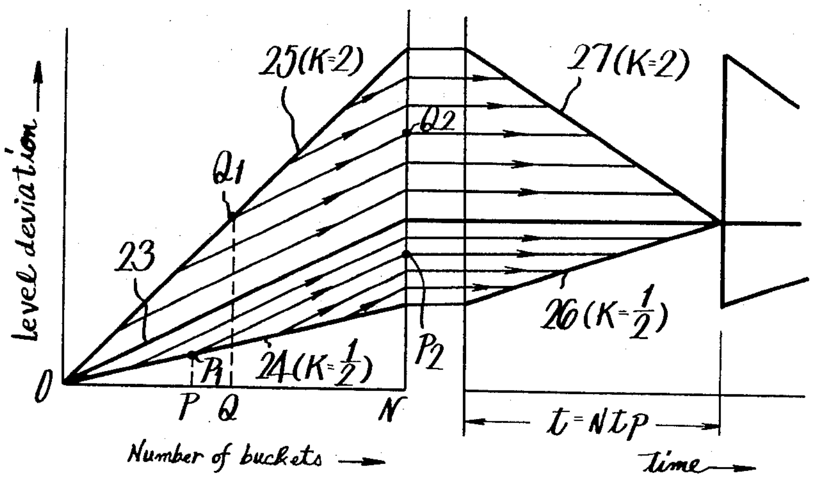
FIG. 4 is a waveform diagram to which reference will be made in explaining the D.C. output level deviation in the processing system depicted in FIG. 1.

Since the level deviation is also in proportion to the time period $t_W$ of the write clock pulse $C_n$ during writing in of the signal, if the tape 2 is driven at the normal speed and if $K = t_W/t_R = 1$, that is $t_W = t_R$ then the relationship between the number of stages which are transferred and the level deviation becomes as indicated in FIG. 4 by the line 23. If the tape 2 is driven at a speed higher than normal, for example at twice normal speed, and $K = 1/2$ or $t_W = 1/2\ t_R$ then the relationship between the number of stages which are transferred and the level deviation becomes as indicated in FIG. 4 by the line 24. If the tape is driven at, for example, one-half the normal speed and $K = 2$ or $t_W = 2t_R$ the relationship is represented by the line 25 in FIG. 4.

Accordingly, in the situation when the tape is driven at twice the normal speed the sample signal stored in the Pth bucket of the delay line at the final time during the writing in procedure is subjected to the level deviation shown at point $P_1$ on the line 24 in FIG. 4. As the signal is finally read out under the control of the clock pulse $C_0$ it is subjected to a level deviation indicated at point $P_2$ in FIG. 4. When the tape 2 is driven at one half the normal speed the sample signal stored in the Qth bucket at the final point in time of the writing operation is subjected to a level deviation shown by point $Q_1$ on the line 25 of FIG. 4 and is subjected to a level deivation shown by point $Q_2$ on line 25 in FIG. 4 after it has been read out. Thus when the tape 2 is driven at twice the normal speed the storing time of the sample signal which may be stored in the normal unit of time equivalent to $t = Nt_R$ becomes shorter than that stored in the latter time. Therefore, as shown in FIG. 4 at line 26, the level deviation becomes large the later in point of time at which it is read out. When the tape 2 is driven at half the normal speed the length of storage time for the sampled signal becomes long and hence the level deviation becomes great as the signal is read out during the normal time period as shown in FIG. 4 at line 27. As a result it will be apparent that the DC level of the signal derived from the switching circuit 10 is changed in a sawtooth waveform at every point in time that $t = Nt_p$ frequency.

As the DC level changes or deviates as mentioned above a pulse like noise is produced when the DC level changes abruptly from its maximum value to its minimum value, or vice versa, which deteriorates from the reproduced sound. This problem is overcome by the present invention which compensates for the variation or deviation of the DC level to prevent the generation of the pulse like noise.

Figure 5:
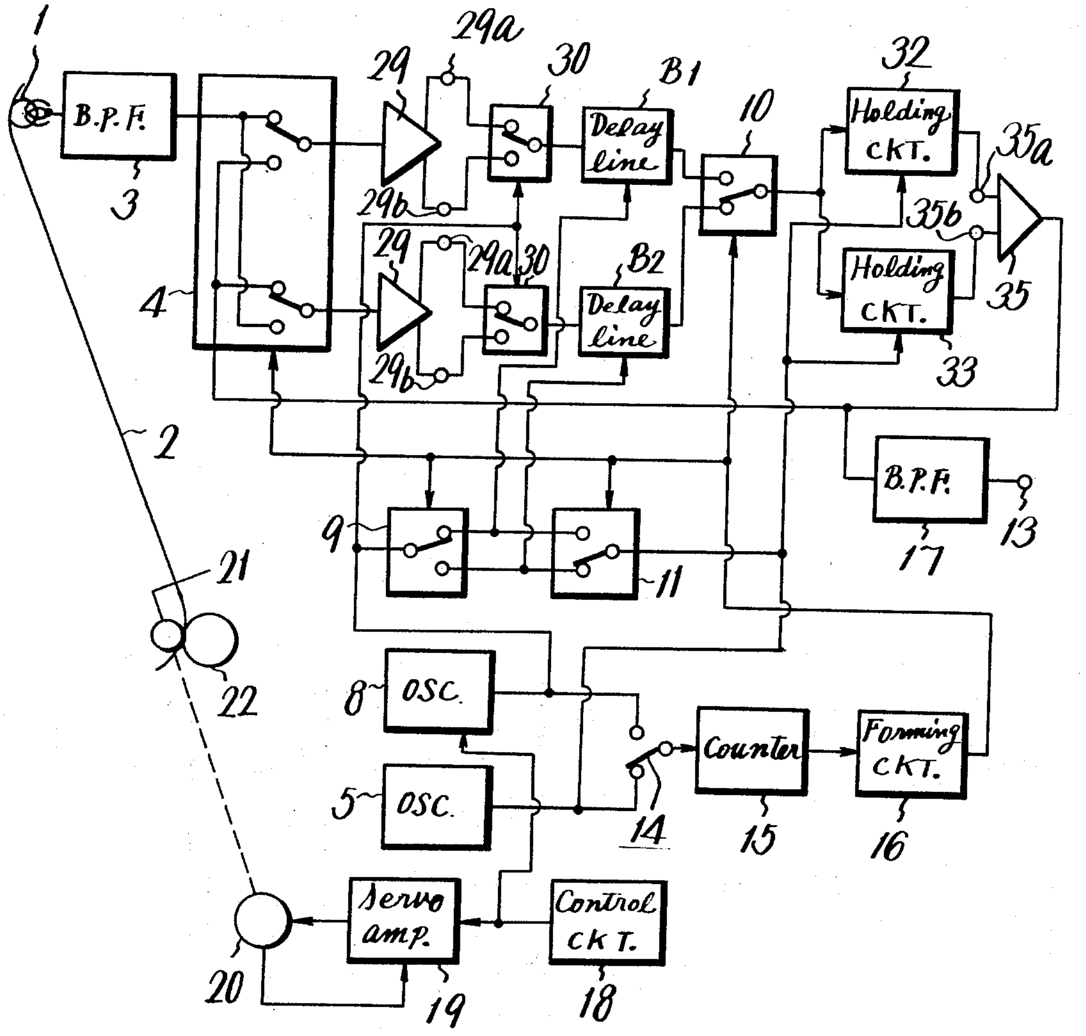
FIG. 5 is a block diagram of a signal processing system according to one embodiment of the invention.

Referring now more particularly to FIG. 5, reference numerals similar to those of FIG. 1 are used to designate similar elements and their description is omitted for the sake of brevity. In this embodiment of the invention during the writing in operation the signal reproduced from the magnetic tape 2 is stored in the delay lines $B_1$ and $B_2$ in such a manner that the reproduced signal is inverted in polarity with every write clock pulse $C_n$. During the reading out operation the same signal in polarity read out from the delay lines $B_1$ and $B_2$ is held during a time interval twice as long as the read clock pulse $C_0$ and then the two signals differing in polarity from each other are subtracted so that the DC level variation is compensated.

Figures 6A, 6B, 6C, 6D, 6E, 6F, 6G:
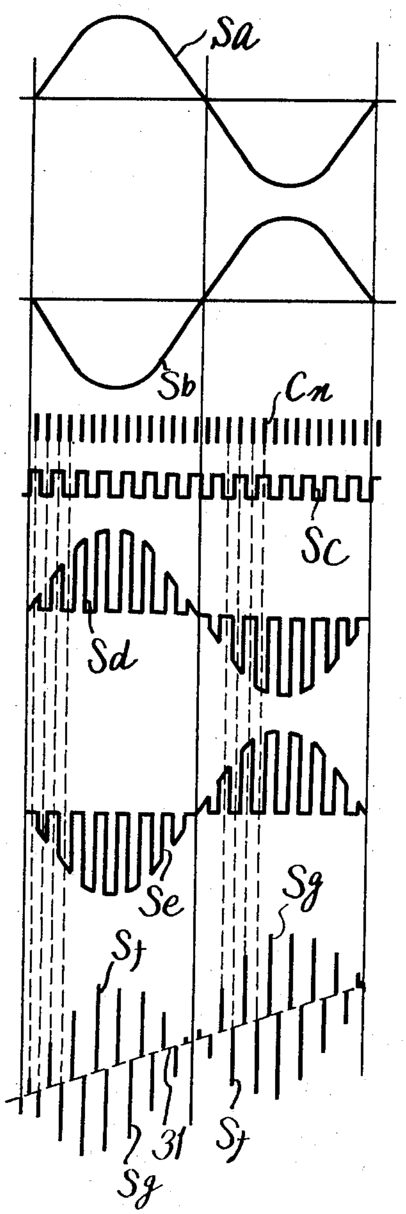
FIGS. 6(*a* thru *g*), 7(*a* thru *g*) and 8 are waveform diagrams to which reference will be made in explaining the output level deviation in the signal processing system according to the embodiment of FIG. 5.

As shown in FIG. 5, the reproduced signal from the switching circuit 4 is fed to a pair of differential amplifiers 29. A signal $S_a$, as shown in FIG. 6A, is obtained from the plus (+) output terminal 29*a* of whichever of the differential amplifiers is connected through the switch 4 to the bandpass filter 3. A signal $S_b$, as shown in FIG. 6B, is obtained from the minus (−) output terminal 29*b* of the same differential amplifier. The output terminals 29*a* and 29*b* of the differential amplifiers are connected to separate input terminals of a separate pair of switching circuits 30. The switching circuits 30 are controlled by a switching signal $S_c$, shown in FIG. 6D, which is formed from the write clock pulse $C_n$ (shown in FIG. 6C). When the signal $S_c$ is in the on state, ie. at a predetermined, relatively high voltage level, the switching circuits 30 are changed to the position shown in FIG. 5 but when the signal $S_c$ is in the off state, ie.

at a relatively low or " zero" voltage level the switching circuits 30 are changed to the opposite position shown in FIG. 5. The outputs from the switching circuits 30 are fed to the separate delay lines $B_1$ and $B_2$ to be stored therein after being sampled by a write clock pulse $C_n$.

Accordingly, when the switching circuits 30 are changed to the position shown in FIG. 5, since a part of a signal $S_d$ is sampled as shown in FIG. 6E, a sampled value or sampled signal $S_f$ shown in FIG. 6G is stored, while when the switching circuits 30 are changed to the reverse position a part of a signal $S_e$ is sampled as shown in FIG. 6F and a sampled value or signal $S_g$ shown in FIG. 6G is stored. As a result, as is apparent from FIG. 6G, the sampled signals are stored in one of the delay lines such that they are reversed in polarity with every write clock pulse $C_n$, and at the time when the storage is finished the DC level is changed or deviated as shown by a dotted line 31 in FIG. 6G.

Figures 7A, 7B, 7C, 7D, 7E, 7F, 7G:
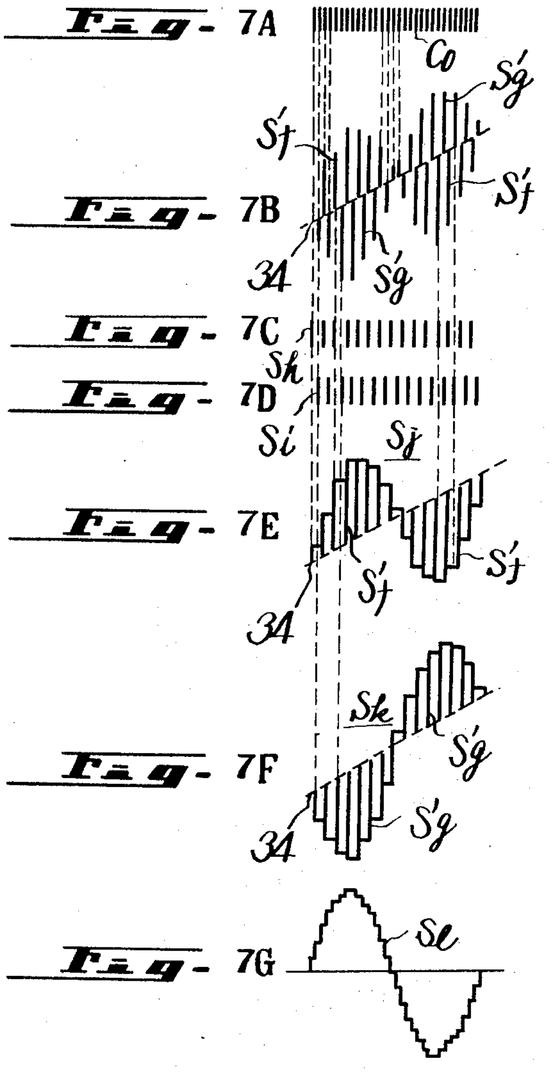

The thus stored signals $S_f$ and $S_g$ are read out from one of the delay lines $B_1$ and $B_2$ by the read clock pulse $C_0$ of the standard frequency as shown in FIG. 7A. The signals $S_f$ and $S_g$ are read out from the delay line (FIG. 7B) and are fed to two holding circuits 32 and 33, respectively, through the switching circuit 10. The holding circuit 32 is controlled by a clock pulse $S_h$ as shown in FIG. 7C for holding the sampled signal $S_f$ applied thereto at the time when the sampled signal $S_f$ is read out, so that only the sampled signal $S_f$ is sequentially held during a time period which is twice the period of the clock pulse $C_0$. The other holding circuit 33 holds the sampled signal $S_g$ under the control of a clock pulse $S_i$ shown in FIG. 7D during a time period which is twice that of the period of the clock pulse $C_0$. The clock pulses $S_h$ and $S_i$ are actually alternate pulses of the pulse train $C_0$ which cause the holding circuits 32 and 33 to hold the respective signals described above in a staggered fashion.

In this case if the DC level of the sampled signal, which is read out from the delay lines $B_1$ and $B_2$, is changed in the manner illustrated by the dotted line 34 shown in FIG. 7B, the DC levels of signals $S_j$ and $S_k$ obtained from the holding circuits 32 and 33 also change as shown by the dotted lines 34 in FIG. 7E and 7F, that is, both the DC levels of the signals $S_j$ and $S_k$ are equally changed or deviated. The signal $S_j$ from the holding circuit 32 is fed to an input terminal 35*a* of a differential amplifier 35 while the signal $S_k$ from the holding circuit 33 is fed to the other input terminal 35*b* of the differential amplifier 35. Thus, the differential amplifier 35 carries out the operation of $(S_j - S_k)$ to deliver therefrom a signal $S_1$ shown in FIG. 7G which has no DC level variation or deviation. Thereafter, the signal $S_1$ is fed to the bandpass filter 17 to deliver a reproduced signal with no change in the DC level to the output terminal 13.

Figure 8:
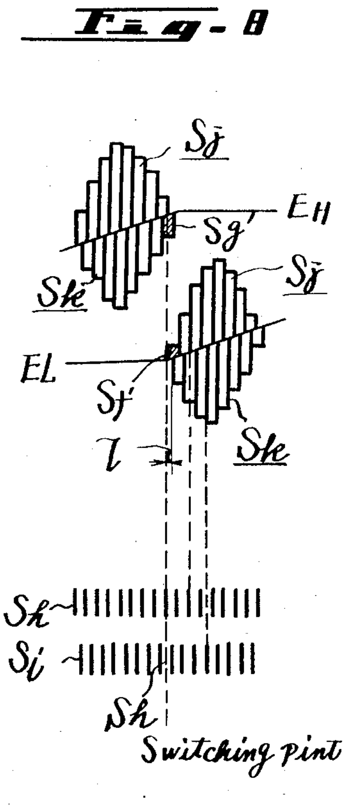

Since the sampled signals $S_f$ and $S_g$ are shifted with respect to each other by the period of the read clock pulse $C_0$ during a time period $\tau$ immediately after switching of the switching circuits 4, 9, 10 and 11, the holding circuit 32 produces the sampled signal $S_f$ which is subjected to a level deviation of $E_L$ (shown in FIG. 8 in hatch lines), while the holding circuit 33 produces the sampled signal $S_g$ which is subjected to a level deviation of $E_H$ (shown in FIG. 8 in hatch lines). Thus, it may be considered that from the differential amplifier 35 there will appear a pulse like noise caused by the difference between the maximum and minimum values of the level deviation.

In order to avoid such a defect it is sufficient that at the time of switching, the holding circuit 33 is also supplied with one clock pulse $S_h$ for holding the signal therein as in the case of the other holding circuit 32 to produce the sampled signal $S_f$ which is subjected to the level deviation of $E_L$ during the time period $\tau$ and hence the differential amplifier 35 is controlled to produce no output signal during the time period $\tau$.

With the present invention constructed as above, the read out signal is substantially free from the DC level deviation thereof and no pulse like noise is produced.

Another embodiment of the present invention will be now described with reference to FIG. 9 in which reference numerals similar to those used in FIG. 1 indicate similar elements and their description is omitted for the sake of simplicity.

Figure 10:
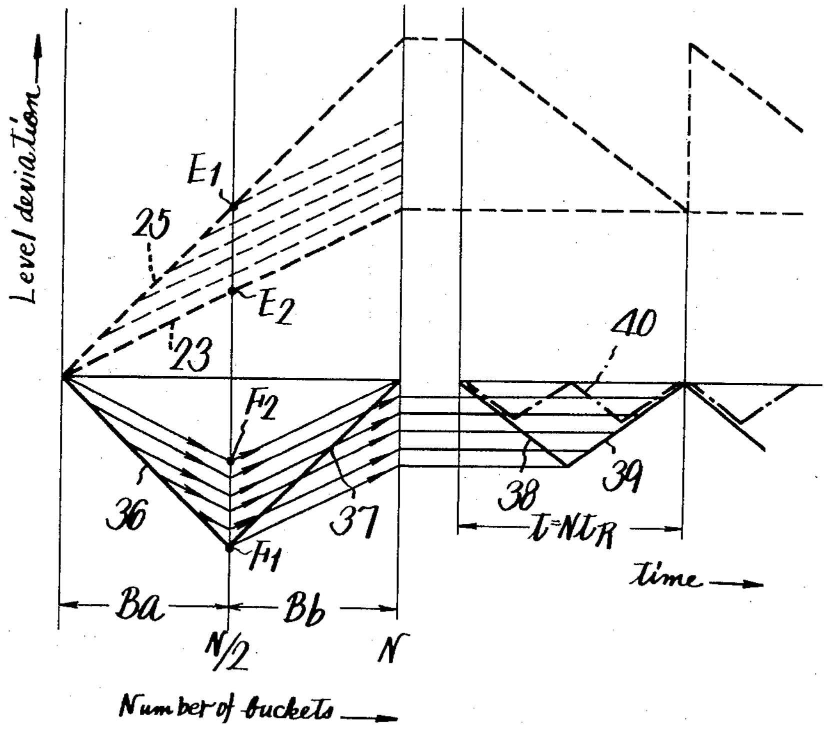
FIG. 10 is a waveform diagram to which reference will be made in explaining the D.C. output level deviation in the signal processing system depicted in FIG. 9.
Figure 9:
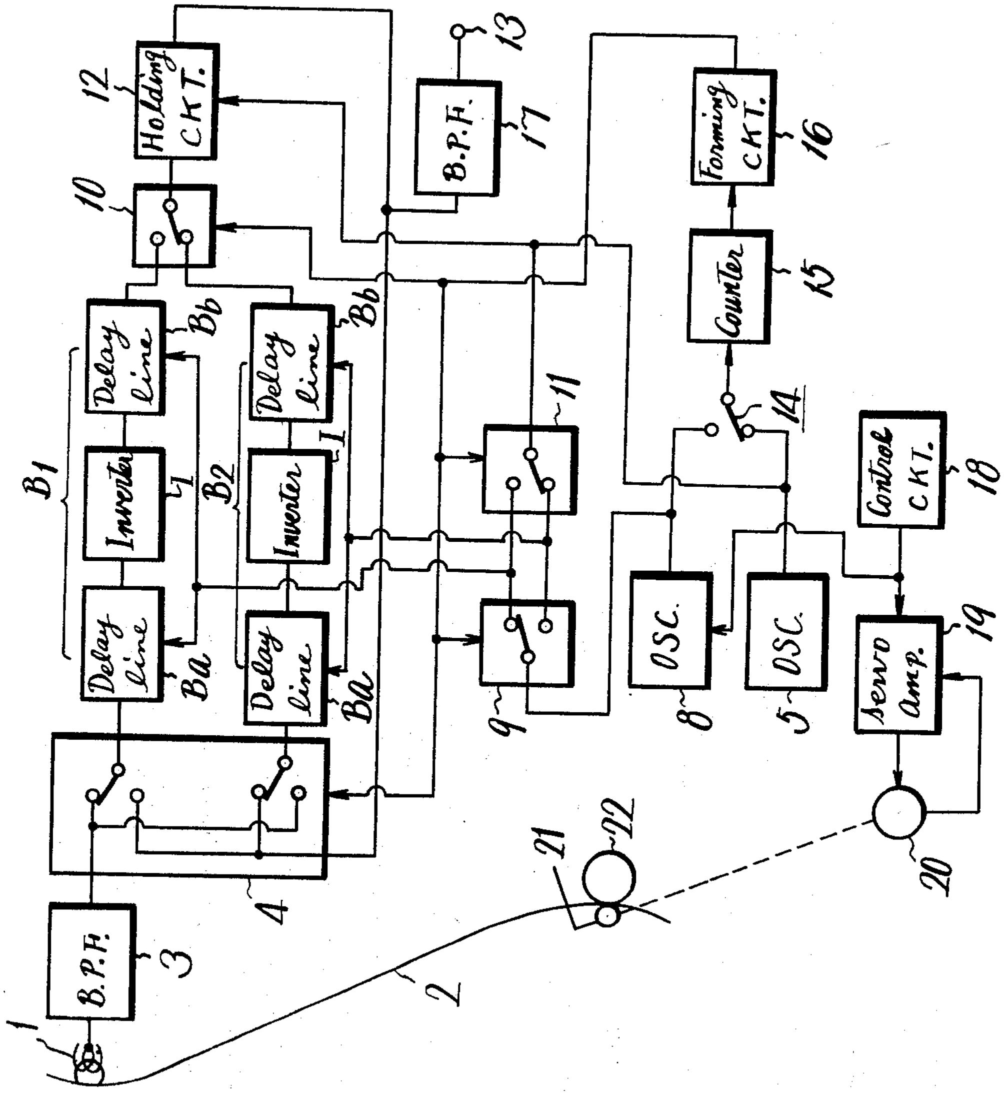
FIG. 9 is a block diagram of a signal processing system in accordance with a second embodiment of the invention.

In the embodiment of FIG. 9, the respective delay lines $B_1$ and $B_2$ are replaced with a plurality of bucket groups. An inverter is inserted between adjacent bucket groups in each delay line. That is, each of the delay lines $B_1$ and $B_2$ consists of an inverter I, which inverts the polarity of an input signal thereto, which is interposed between front and back bucket groups $B_a$ and $B_b$ as shown in FIG. 9. Thus, if the magnetic tape 2 is driven at half the normal speed and $K = 2$ is satisfied, by way of example, at the time when the storing of the signal is finished during a unit time period, the sampled signal which is stored in the back bucket group $B_b$ has a relationship between the number of transferred stages and the level deviation as shown in FIG. 10 by a dotted line 25 during the time period within which it is transferred through the front bucket group $B_a$. However, if the output side of the inverter I is considered, due to the fact that the output of the inverter I is opposite in polarity to its input, the same relationship becomes as shown in FIG. 10 by a solid line 36. At the time when the sampled signal is further transferred through the back bucket group $B_b$ to complete the storage, the relationship between the number of stored stages and the level deviation can be shown as in FIG. 10 by a solid line 37. Accordingly, when the sampled signal stored in the back bucket group $B_b$ is read out its level deviation becomes as shown in FIG. 10 by a solid line 38 which changes with time.

The sampled signal stored in the back bucket group $B_b$ has the relationship between the stored number and the level deviation indicated by the dotted line 25 in FIG. 10 as mentioned above. During reading out, the level deviation of the sampled signal changes linearly within the range from a point $E_1$ to a point $E_2$ in FIG. 10 at the output side of the front bucket group $B_a$ in response to the bucket position in which the sampled signal is stored. The output of the inverter I correspondingly changes linearly within the range from a point $F_1$ to a point $F_2$ in FIG. 10. Accordingly, when the sampled signal stored in the front bucket group $B_a$ is transferred through the back bucket group $B_b$ and then finally read, its level deviation changes as shown in FIG. 10 by a solid line 39.

As is shown in FIG. 10, the level deviation of the sampled signal read out from the delay line changes in a triangular shape and the difference between its maximum and minimum values becomes one half as compared with that of the prior art.

It will be apparent without being further illustrated that the same result can be obtained when the magnetic tape 2 is driven at twice the normal speed and hence K = ½ is satisfied.

In the embodiment of FIG. 9, the respective delay lines $B_1$ and $B_2$ are divided into two equal parts, but it will be easily understood that they can be divided into three or more with the same effect. In the case where the delay lines $B_1$ and $B_2$ are each divided into three parts the level deviation of the output signal becomes as shown in FIG. 10 by a dotted line 40.

With the present invention, the DC level of the read out signal changes in a triangular shape and accordingly the DC level changes abruptly with the result that no pulse-like noise is produced.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A signal processing system for performing signal compression and/or expansion with respect to analog information signals which are being reproduced at a rate other than that at which said signals have been recorded comprising:

a. delay line means for receiving said reproduced analog information signals and for propagating said analog information signals with controllable time transformation;

b. means for controlling said delay line means to produce said time transformation; and c. means for compensating for a DC level-deviation of an output signal read out from said delay line means.

2. A signal processing system according to claim 1, in which said delay line means comprise a pair of shift registers which are used alternately for writing in and reading out said analog information signals.

3. A signal processing system according to claim 2, in which said delay line means further comprises means for recirculating the signal read out from each said shift register to an input thereof.

4. A signal processing system according to claim 2, in which said control means is provided with a first clock signal generator the frequency of which is set in relation to the rate at which said information signal is reproduced and a second clock signal generator of fixed frequency.

5. A signal processing system according to claim 4, in which an information signal is alternately written in one of said registers by said first clock signal while a second information signal is read out from the other of said registers by said second clock signal.

6. A signal processing system for performing signal compression and/or expansion with respect to analog information signals which are being reproduced at a rate other than that at which said signals have been recorded, comprising:

delay line means for receiving the reproduced analog information signals and for propagating said analog information signals with controllable time transformation;

means for controlling said delay line means to determine said time transformation of the signals propagated therealong; and means for compensating a DC level-diviation of an output signal read out from said delay line means including a. means for receiving said reproduced information signals and for converting them into a pair of input signals differing in phase by 180° from each other;

b. means for alternately sampling said pair of oppositely phased input signals and for supplying a sampled signal to said delay line means;

c. means for detecting an in phase component of said output signal read out from said delay line means and for producing a pair of output signals differing in phase from each other; and d. means for differentially processing said pair of output signals derived from said detecting means.

7. A signal processing system according to claim 6, in which said differential processing means comprises a differential amplifier having a pair of output terminals from which said pair of input signals are derived respectively.

8. A signal processing system according to claim 6, in which said detecting means comprises two signal holding circuits, respectively driven by clock signals differing in phase by 180° from each other, for holding said read-out signal from said delay line means for at least twice the duration of said sampled signal.

9. A signal processing system according to claim 6, in which said differential processing means includes a differential amplifier having a pair of input terminals to which said pair of output signals are separately supplied.

10. A signal processing system according to claim 1, in which said D.C. level compensating means comprises inverter means interposed in said delay line means for inverting said information signal in the course of the propagation of the latter along said delay line means.

11. A signal processing system for sound signal compression and/or expansion comprising:

a. a first differential amplifier having an input terminal and a pair of output terminals, said input terminal being coupled to an external source of an information signal so as to produce a pair of information signals reversed in phase with respect to each other from said output terminals;

b. switching means coupled to said output terminals for alternately sampling said oppositely phased information signals;

c. a shift register connected with said switching means for propagating said signals sampled by said switching means with time transformation;

d. a clock signal generator for controlling said switching means and said shift register to produce said time transformation in signals read out of said shift register;

e. a pair of signal holding circuits for holding the in phase components of said signals read out of said shift register; and f. a second differential amplifier having a pair of input terminals and an output terminal, said input terminals respectively being coupled to said pair of signal holding circuits and said output terminal being coupled to a system output.

12. A signal processing system for signal compression and/or expansion of reproduced information signals comprising:

a. a plurality of shift registers arranged in two groups, one of said groups of registers being alternately used for writing in a reproduced information signal and for reading out said information signal previously written therein, and the other of said groups of registers being alternately used for writing in a reproduced information signal and for reading out said information signal previously written in said other group while said one group is being used for reading out and writing, respectively;

b. means for generating a first clock signal having a frequency corresponding to the rate at which said information signal is reproduced, said first clock signal being used for writing said information signal in said one and other groups of shift registers;

c. means for generating a second clock signal having a fixed frequency, said second clock signal being used for reading out said information signal from said one and other groups of shift registers; and d. inverting means interposed between said shift registers in each of said groups for inverting the phase of said information signal written in the respective group of shift registers prior to the reading out thereof.

* * * * *